3,195,134
WIDE BASE DOPPLER RADIO NAVIGATION SYSTEM
Fritz Steiner, Pforzheim, Germany, assignor to International Standard Electric Corporation, New York, N.Y., a corporation of Delaware
Filed Jan. 2, 1963, Ser. No. 248,934
Claims priority, application Germany, Jan. 11, 1962, St 18,749
4 Claims. (Cl. 343—106)

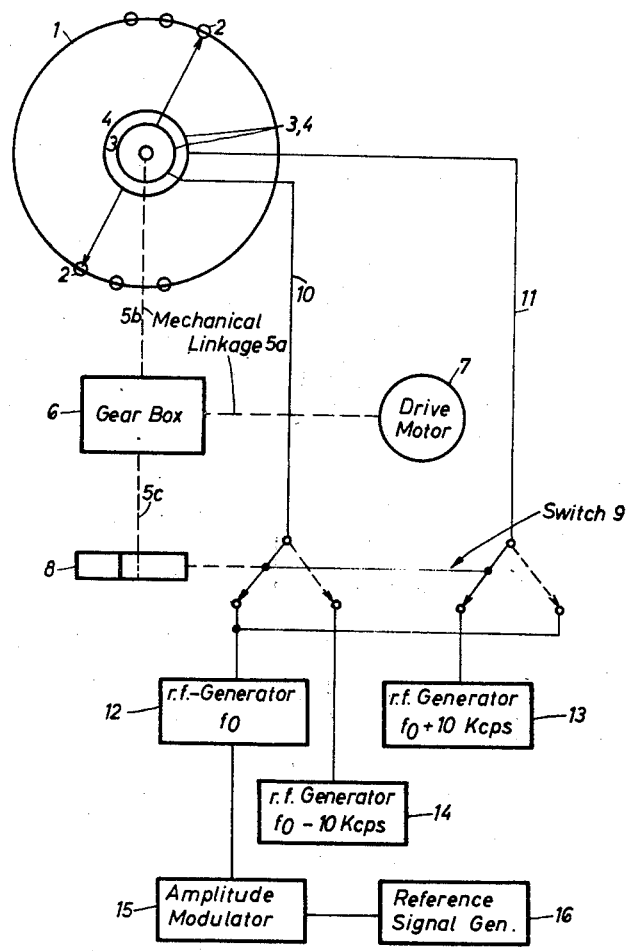

This invention relates to omnidirectional radio bearing systems and more particularly to a Doppler radio navigation system.

U.S. patent application for "Omnidirectional Radio Bearing System," Serial No. 10,695, filed February 24, 1960, now U.S. Patent No. 3,115,633, refers to a wide base Doppler radio navigation system in which the Doppler-signal will be obtained either by the kind of reception of the incoming electro-magnetic waves without any directional modulation, radiated by a transmitter (direction finder) or in which the Doppler directional information is already impressed upon the transmitted waves as a frequency modulation, being the criterion for the bearing information (radio beacon). Thereby a wide base antenna system will be used which consists of a number of single antennas arranged on the periphery of a circle having a diameter of several wave lengths, of which two individual antennas positioned either exactly or approximately on said diameter are supplied with radio energy in a cyclical sequence in case of a radio beacon or, in case of a direction finder, these individual antennas will be connected in the same way to the input of a special radio receiver. If the system operates as a radio beacon one of the operating antennas will be fed with VHF-energy of a certain frequency $f_0$ from a transmitter which is amplitude-modulated with the simulated gyration frequency of the antennas (switching frequency 30 c./s.) keeping a certain modulation degree (30%). The correspondingly effective other antenna will be fed with about 10% of the power of the first antenna differing in frequency by a certain amount (10 kc./s.), either a lower or a higher frequency. In the cooperating receiver a beat frequency of the frequency difference (10 kc./s.) occurs which on one hand is amplitude-modulated with the reference frequency (30 c./s.) and on the other hand, due to the Doppler-effect, is frequency-modulated with the simulated gyration frequency (30 c./s.), depending on the direction.

The power ratio of the VHF energy does not influence formation of a beat frequency; it has only been selected in such a way that the beat frequency shows a sinusoidal curve. On the receiver end, in the known manner, the reference voltage will be derived from the amplitude modulation and the bearing signal from the frequency modulation. The direction is determined by comparing the phases of the reference voltage and of the directional voltage.

The invention relates to the application of the system for determining the direction of a radio beacon.

It has been shown that due to the continuous change of position of the antenna which radiates the amplitude-modulated VHF-energy another undesired amplitude modulation will be impressed, by the switching-over frequency. This undesired amplitude modulation varies according to the phase of the amplitude modulation impressed on the VHF-energy and modulates the reference voltage, so that the resulting low frequency voltage contains more or less large phase errors depending on the position of the radiating antennas or depending on the position of the receiver-station.

This error will be eliminated completely by this invention.

It is known to reduce this error by a particular design of the antenna system, for example by laying out a sufficiently large counterpoise; however, complete suppression of the error is not possible by this measure. Besides, the expenditure necessary for such counterpoise is high and causes a considerable increase in costs for the antenna system.

An object of this invention is to reduce the amplitude modulation error introduced into Doppler omnidirectional beacons by the simulated rotation of the antennas.

This invention therefore proposes to compensate for this undesirable directional-dependent amplitude modulation in that the very high frequency signals are radiated in successive switching cycles in such a way that at the first switching cycle one antenna radiates the power of the transmitter amplitude-modulated with the gyration frequency of 30 c./s. (main carrier), while the other antenna radiates about 10% of the power of the first antenna with the upper sideband of a carrier frequency amplitude-modulated with 10 kc./s. as it has been described in the parent specification. In the second switching cycle the first antenna radiates the corresponding lower sideband of the modulation ($f_0$–10 kc./s.) while the second antenna radiates, as outlined above, the main carrier, that is, the frequency $f_0$.

The frequency modulation of the very high frequency voltage resulting from the simulated motion of the antennas coincides with the amplitude modulation impressed on the main carrier and serves to derive the phase locked reference voltage in both switching cycles. However, by changing position the undesired amplitude modulation occurs in two successive switching cycles, always with the phase shift of 180° at the receiver end. This enables a complete compensation of the phase error.

These and other features and objects will become more apparent by reference to the following description taken in conjunction with the sole figure of the accompanying drawing which shows an embodiment of this invention.

In the figure there is shown a circular antenna system 1 comprising an even number of radiating elements 2, such as dipoles, two of which, situated opposite to each other on the circular antenna system, are fed in sequence with RF-energy of different RF-frequencies by means of leads 10 and 11 respectively, slip rings 3 and 4 respectively, and switch 9 from RF-generators 12, 13, or 12, 14 respectively. The switching arrangement may be rotated by drive motor 7, mechanical linkage 5a, gear box 6, mechanical linkage 5b and mechanical linkage 5c and eccentric disc 8 respectively, so that RF-energies of generators 12 and 13 or 14 and 12 respectively are fed to the radiating elements 2, simulating a circular motion of each two radiating elements at a time. The RF-energies of generators 12, 13 and 14 may be separately generated but it is to be clearly understood that the RF-energies of generators 13 and 14 can also be generated by sideband modulation (±10 k.c.p.s.) from the master generator 12 by means of a modulator (not shown) and a low frequency generator (not shown). In order to provide a reference phase signal at the receiving end generator 12 is amplitude modulated by means of amplitude modulator 15 and reference signal generator 16.

Switching over of both switching cycles can be achieved with a lower frequency as compared with the reference frequency, however, it must be selected so that the airborne indicating equipment cannot follow the switching cycle due to its own inertia. With the airborne indicating devices used a switching frequency of about 5 c./s. is sufficient. The system described here can be received with the common receivers for VOR radio beacons, if the frequency difference of both very high frequencies feeding the two antennas is 9960 c./s. and if the diameter of the circular antenna system at a switching frequency of 30 c./s. will be selected in such a way that the maximum frequency deviation is 480 c./s. That means that the diameter of the circular antenna system must be about 5 wave lengths considering the frequency of about 100 mc./s., usually used for VOR radio beacons.

Switching-over devices to perform the switching cycle are known; they may operate either galvanically, inductively, or capacitively. It is of particular advantage to use the capacitive commutator in a suitable design for this purpose as already used in other radio navigation systems.

While I have described above the principles of my invention in connection with specific apparatus, it is to be clearly understood that this description is made only by way of example and not as a limitation to the scope of my invention as set forth in the objects thereof and in the accompanying claims.

I claim:

1. A wide base Doppler radio navigation system with a circular antenna system consisting of a number of individual antennas, in which two individual antennas located diametrically opposite to each other, will be cyclically connected to the transmitter whereby one individual antenna will be fed with the carrier and the other one with a modulation sideband to provide at the receiver-end a frequency-modulated wave for phase comparison with a reference voltage to determine the direction, comprising, a first source of upper sideband signals and a second source of lower sideband signals, a source of carrier signals, and switching means coupling said source of upper and lower sideband signals and said carrier source to said antennas and means connected to said switching means for coupling alternatively and successively to each one respectively of a pair of antennas, said carrier signal and one of said sideband signals, and at each switching cycle the position of carrier and sideband will be interchanged whereby in one position the upper sideband signal and carrier signal and in the other position the lower modulation sideband signal and carrier signal will be radiated.

2. A wide base Doppler radio navigation system according to claim 1 further comprising means interchanging said carrier and sideband signal after a pre-determined number of switching positions.

3. A wide base Doppler radio navigation system according to claim 2 further comprising means interchanging said carrier and sideband signals after an integral multiple of complete rotations of the antenna switching cycle.

4. A wide base Doppler radio navigation system according to claim 1 wherein the carrier signal frequency is modulation frequency is 9960 c./s. and the gyration of the antennas 30 c./s. and the diameter of the antenna system in relation to the frequency of the carrier signal produces on the receiver-end a maximum frequency deviation of 480 c./s.

References Cited by the Examiner

UNITED STATES PATENTS 3,115,633  12/63  Kramer et al. _____ 343—113 X

CHESTER L. JUSTUS, *Primary Examiner.*